Figure 1:
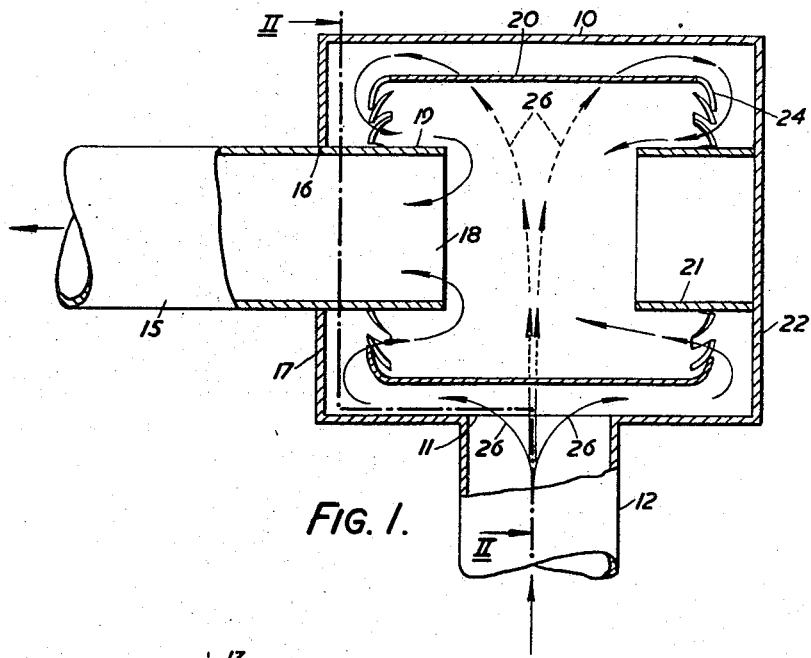

March 24, 1959 — F. F. L. MORGAN — 2,878,627
TRAPS FOR PARTICLES IN AN AIRSTREAM
Filed May 28, 1957

INVENTOR
FREDERIC F. L. MORGAN
BY
Watson, Cole, Grindle & Watson
ATTORNEYS

United States Patent Office 2,878,627
Patented Mar. 24, 1959

2,878,627

TRAPS FOR PARTICLES IN AN AIRSTREAM

Frederick Francis Llewellyn Morgan, Camborne, England, assignor to Holman Brothers Limited, Camborne, England, a company of Great Britain Application May 28, 1957, Serial No. 662,156

Claims priority, application Great Britain May 29, 1956

11 Claims. (Cl. 51—270)

This invention relates to traps for intercepting hot particles moving in an air stream flowing through a conduit, and is particularly although not exclusively applicable to suction-type dust removers for grinders. For example, in United States of America patent appln. No. 606,692, now Patent No. 2,819,571 a dust extractor for a grinder is described, which includes a pipe connected to a source of suction and provided with a suction nozzle through which hot dust particles are withdrawn by the suction from the working region of the grinder.

It has been found that some of the particles withdrawn by the dust extractor are extremely hot and may be in a molten or semi-molten condition, and that these particles tend to accumulate in the pipe and in other parts of the dust extractor and also tend to melt the walls of the dust extractor and to become embedded therein. One object of the present invention is to provide a trap capable of intercepting these hot particles before they produce their ill-effects on the dust extractor and its conduits, without necessarily removing the particles altogether from the air stream.

According to the present invention a trap for intercepting hot particles in an air stream flowing through a conduit comprises a chamber interposed in the length of the conduit and having an inlet opening through which the air stream enters and an outlet opening through which it leaves the chamber and a rotor within the chamber in a position in which the particles entering the chamber with the air-stream through the inlet opening impinge on its surface, the rotor being arranged to rotate so as to present a changing surface on which the particles moving in the air stream will strike.

Conveniently the rotor may be arranged to be rotated by the air stream itself passing through the chamber.

Thus as the rotor rotates a continually changing surface will be presented to the incoming air stream and to the particles therein, wtih the result that the particles adhering thereto will tend to build up on the rotor in a thin film distributed around its surface rather than in a mass on a single part of its surface, whilst the heat transmitted to the rotor from the red-hot or molten particles will be correspondingly distributed over a wide area of the rotor surface.

In one form of the invention the chamber is cylindrical with the inlet opening formed in its cylindrical side wall, while the rotor comprises a hollow cylinder which is of smaller diameter and of shorter axial length than the chamber. In this case the rotor may be loosely housed within the chamber so as to be free to move laterally in directions transverse to its axis of rotation, as well as to rotate about its own axis of symmetry or an axis generally parallel thereto.

Furthermore the axis of the chamber is preferably horizontal, with the air stream arranged to enter the chamber through the inlet opening in the upward direction, and the rotor may be so light as to be lifted by the air stream.

Thus the rotor will spin freely within the cylindrical chamber while a film of metallic material becomes deposited upon its cylindrical outer surface due to the impingement on it of the semi-molten particles. From time to time the rotor will rotate eccentrically within the chamber, when the deposited film becomes sufficiently heavy or becomes unevenly distributed, and the rubbing of the cylindrical surface of the rotor on the wall of the chamber will cause the film to be removed in flakes from the rotor and carried away by the air stream. By this time the particles will have cooled substantially.

Preferably the air stream directed through the inlet opening in the cylindrical wall of the chamber impinges obliquely on the cylindrical surface of the rotor, so as to tend to rotate the latter. The outlet opening may be formed in one end wall of the cylindrical chamber.

The rotor may be open-ended and the outlet opening may be surrounded by a length of tube protruding inwardly coaxially with the chamber, and projecting within the interior of the rotor through one open end thereof, the inner end of the tube within the rotor being open and the other end leading to the downstream part of the conduit.

To balance the axial thrust of the air stream on the rotor, a second similar length of tube may be mounted coaxially with the first tube on the opposite end wall of the chamber, projecting a corresponding distance inwardly within the chamber, the second tube projecting into the other open end of the rotor, and being closed at its outer end.

This arrangement ensures that air flowing between the inlet and outlet passages cannot flow directly from one to the other but must take a somewhat tortuous passage, first impinging on and passing around the outside of the rotor and thence flowing inwardly through its open ends and to the outlet passage. During their motion with the airstream along this tortuous path such hot particles as do not adhere to the outer surface of the rotor but are deflected from it will lose a considerable amount of their heat before they pass through the outlet opening into the downstream part of the conduit.

The rotor may be formed with vanes which are acted on by the airstream in the chamber to aid the rotation of the rotor. Conveniently these vanes may be formed around the periphery of each open end of the rotor and may project radially inwardly, the vanes affording surfaces inclined obliquely to the axis of the rotor so that the flow of the air stream past them tends to spin the rotor.

Figure 2:
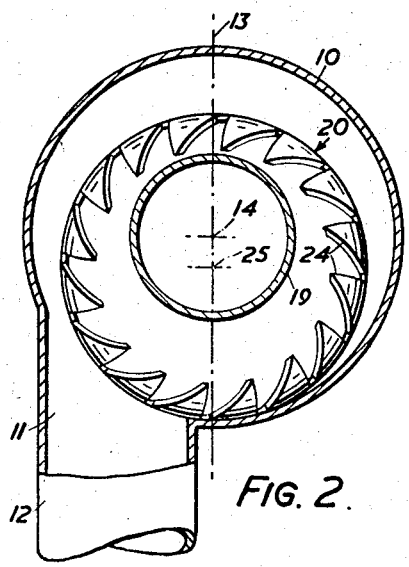
Figure 3:
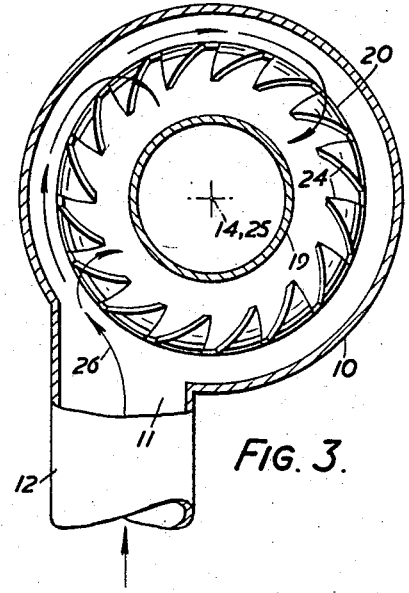

The invention may be carried into practice in various ways, and one specific embodiment will now be described by way of example with reference to the accompanying drawings, in which Figure 1 is a sectional side view of a trap for intercepting hot particles being carried along in an air stream in a conduit, Figure 2 is a section on the line II—II of Figure 1 showing the trap with its rotor stationary, and Figure 3 is a view similar to Figure 2 showing the rotor in one possible running position.

In the embodiment illustrated, the invention is applied to a trap for intercepting hot, possibly molten particles being carried along in an air stream through a duct which forms part of a dust extractor for a grinder. The co-pending United States of America patent appln. No. 606,692, now Patent No. 2,819,-571, describes a dust extractor for a grinder which includes a pipe along which the very fine particles of dust which are particularly dangerous to health are withdrawn, together with certain of the larger particles, from the working region of the grinder by suction, the withdrawn particles including both particles of the metal of the work which is being ground and particles of the grinding wheel itself.

The very fine particles of dust are very dangerous to health if inhaled by an operator, and the dust extractor described in the aforementioned co-pending specification is intended to remove these particles from the working region and to prevent them entering the atmosphere in the workroom and being inhaled by the operator. The larger particles, which are projected at high speed from the working region and which may be red-hot or semi-molten, are too heavy to be likely to be inhaled by the operator, but they can affect the operation of the dust extractor either by becoming embedded whilst still very hot or molten in the walls of the extractor pipe and damaging it, or by building up or aggregating in the pipe and thus blocking or partly blocking the pipe.

A trap designed to intercept these particles whilst still very hot is therefore interposed in the pipe in order to reduce these ill effects. The trap consists of a cylindrical sheet metal chamber 10 arranged with its axis horizontal, and formed with an inlet opening 11 in its cylindrical side wall into which leads a circular inlet pipe 12 adjacent to and communicating with the suction mouth (not shown) of the dust extractor. As illustrated in Figures 2 and 3 of the drawings the pipe 12 extends vertically upwards into the lower part of the chamber 10 to one side of the vertical plane 13 through the axis 14 of the chamber 10. A horizontal outlet pipe 15 constituting the downstream portion of the suction duct of the dust extractor extends coaxially with the chamber 10 through an aperture 16 in one end wall 17 of the chamber. The outlet pipe 15 protrudes inwardly within the chamber 10 for a distance equal to about a quarter of the axial length of the chamber, and the open inner end 18 of the inwardly protruding part 19 of the pipe 13 afford an outlet from the chamber 10.

The air stream is prevented from travelling directly across the interior of the chamber 10 from the inlet opening 11 to the open end 18 of the outlet pipe 15 by a hollow cylindrical rotor 20, also made of sheet metal, which is positioned within the chamber 10 in the annular space between the wall of the chamber on the one hand and on the other hand the exteriors of the inwardly protruding portion 19 of the outlet pipe 15 and of corresponding short length of blind pipe 21 secured to the other end wall 22 of the chamber 10 coaxially with it. The blind pipe 21 projects inwardly a corresponding distance into the interior of the chamber 10 and protrudes into the other open end of the hollow rotor 20.

The rotor 20 is in the form of a cylindrical shell of stainless steel or other suitable metal, the open ends of the shell being each formed with sixteen saw teeth 24 which are bent over inwardly and are twisted so that they are oblique to the end plane of the shell, and thus constitute vanes by which the rotor will be rotated by an air stream entering it inwardly through either end. The tips of the vanes 24 lie on a circle of smaller diameter than the rotor 18 but of a sufficiently large diameter that the vanes will not come in contact with the inwardly protruding end 19 of the outlet pipe 15 or with the blind pipe 21, whatever position the rotor 20 may take up within the chamber 10.

The rotor 20 is not pivoted on fixed bearings within the chamber 10 but is freely housed within the chamber so as to be capable of rotating about its own axis 25 and also to be capable of linear movement transversely to the axis of the chamber 10 in any direction until the rotor comes into contact with the wall of the chamber 10. The rotor 20 is large enough to overlie and obscure a large part of the inlet opening 11.

When no air stream is being drawn by suction through the duct 12—15 and through the chamber 10, the rotor 20 will normally lie in the bottom part of the chamber 10 as shown in Figure 2. However when a stream of air is drawn through the inlet pipe 12 into the chamber, the rotor will be lifted by the air flow which enters vertically upwards, and will also be rotated by the air flow which strikes the cylindrical outer surface of the rotor at an angle oblique to the normal. The size and weight of the rotor will be chosen to suit a particular application in accordance with the velocity and rate of flow of the air stream, so that the rotor is capable of being just maintained rotating in a free floating position within the chamber 10, as illustrated in Figure 3.

The incoming air stream from the pipe 12 enters the annular space between the rotor 20 and the inside of the wall of the chamber 10, and impinges upon the outer cylindrical surface of the rotor 20 so that hot particles carried by the air stream strike the rotor surface and will tend to adhere to it and build up upon it, or to be deflected by it. The air stream proceeds circumferentially around the rotor whilst at the same time dividing it into two streams as indicated by the arrow 26 in Figures 1 and 3, the two streams moving respectively outwardly towards the two ends of the rotor 20. The two streams are then deflected inwardly again by the end walls 17 and 22 of the chamber 10 so as to enter the two open ends of the rotor 20, at the same time acting on the obliquely inclined vanes 24 so as to apply a spinning torque to the rotor 20 to cause or assist the rotation of the rotor. The two air streams unite again in the interior of the rotor 20 and leave it through the open end 18 of the outlet pipe 15.

Thus the hot particles in the air stream entering the pipe 12 and impinging on the rotor 20 will strike a constantly changing surface as the rotor rotates, so that the particles will tend to form a continuous film on the cylindrical outside surface of the rotor rather than to build up into a solid lump on it. As the deposited film increases in thickness, the rotor will become heavier until it can no longer be supported by the incoming air stream. Alternatively the film may become irregular in thickness around the circumferential surface of the rotor. In either case the rotor will no longer continue to rotate coaxially with the drum 10 as indicated in Figure 3, but will move to an eccentric position in which it will rub against the inner surface of the wall of the chamber 10 whilst rotating. This rubbing action will tend to break up and remove the film of aggregated material as a series of flakes which will be carried away by the air stream through the outlet passage 15 into a suitable collector (not shown). It this way the trap is self-cleaning.

Hot particles entering the chamber with the air stream and striking the external surface of the rotor without adhering to it will be deflected but will impart some of their heat to the rotor, and will also tend to be slowed down. Such deflected particles may travel around the rotor with the air stream until eventually they enter the interior of the rotor and pass out with the air stream through the outlet pipe 13. In either case the deflected particles will be cooled, by transferring some of their heat to parts of the trap such as the rotor or to the air which carries them during their extended tortuous passage through the trap, and these particles will therefore be substantially cooler when they eventually enter the outlet passage 15 and will thus be then unlikely to cause any damage. In any case the particles leaving the trap will enter the outlet pipe 15 in a longitudinal direction so that they are not likely to become embedded in its walls.

The trap is made of a metal to which the particles will not adhere permanently and in the surface of which the particles will not tend to become embedded, for example stainless or heat resisting steel.

It will be appreciated that the trap described and illustrated by intercepting the hot particles carried by the air stream at a region close to the suction mouth associated with the grinder, will substantially reduce the ill effects which can be caused by the building up of such particles in the various passages of the dust collectors or by their becoming embedded in the walls of the passages and damaging them by their heat.

What I claim as my invention and desire to secure by Letters Patent is:

1. A trap for intercepting hot particles in an airstream, which comprises a conduit through which the airstream flows, a cylindrical chamber interposed in the length of the conduit and having inlet and outlet openings through which the airstream passing through the conduit respectively enters and leaves the chamber, and a hollow cylindrical rotor loosely housed in the chamber in a position in which the airstream and particles entering the chamber with the airstream impinge obliquely on its cylindrical outer surface the rotor diameter being less than that of the chamber and, the rotor being free to move laterally in the chamber in directions transverse to its axis into contact with the internal wall surface of the chamber and in addition to rotate about its axis of symmetry under the impulse of the impinging airstream.

2. A trap for intercepting hot particles in an airstream, which comprises a conduit through which the airstream flows, a cylindrical chamber interposed at one end and having a cylindrical side wall formed with an inlet opening through which the airstream enters the chamber interior and a flat end wall formed with an outlet opening through which the airstream leaves the chamber interior in a direction at right angles to its direction of entry, and a hollow cylindrical rotor whose diameter and axial length are less than those of the chamber interior, the rotor being loosely housed in the chamber in a position in which particles entering the chamber with the airstream through the inlet opening impinge obliquely on its cylindrical outer surface and the rotor being free to move laterally in the chamber in directions transverse to its axis into contact with the internal wall surface of the chamber and also to rotate in the chamber about its axis of symmetry.

3. A trap as claimed in claim 2 in which the axis of the chamber is horizontal and the inlet opening is formed in the lower part of the chamber sidewall and in which the rotor is so light that it is capable of being lifted by the airstream impinging on it.

4. A trap as claimed in claim 2 in which the rotor is open-ended, and which includes a length of tube which protrudes inwardly from the outlet opening coaxially with the chamber and projects within the interior of the rotor through one open end thereof, the inner end of the tube being open and the tube leading at its other end to the downstream part of the conduit.

5. A trap as claimed in claim 4 which includes a second tube mounted coaxially with the first tube on the opposite end wall of the chamber, the second tube projecting inwardly within the adjacent open end of the rotor and being closed at its outer end.

6. A trap as claimed in claim 2 which includes vanes formed on the rotor for engagement by the air flow.

7. A trap as claimed in claim 6 in which the vanes are formed on the peripheral edges of the rotor at both ends and project radially inwardly, the vanes also affording surfaces inclined obliquely to the axis of the rotor.

8. A trap for intercepting hot particles in an airstream, comprising a cylindrical chamber, an air inlet conduit communicating with the interior of said chamber in a direction generally tangential to the cylindrical axis of said chamber, at a location medially of the length of said axis, in combination with a hollow cylindrical rotor of substantially smaller axial and diametrical dimensions than said chamber, disposed in said chamber for free floating suspension and rotation about its cylindrical axis under the influence of air injected through said inlet conduit, the cylindrical axis of said rotor normally being substantially parallel to the cylindrical axis of the chamber, said rotor having a cylindrical surface positioned in alignment with said inlet conduit, and having an open axial end spaced from the corresponding axial end of said chamber to permit free passage of air around said end of the rotor and into its interior, and a discharge pipe fixed to an extending axially through an end of said chamber into said rotor interior, said pipe being of smaller diameter than the opening in the end of said rotor and communicating axially with the rotor interior to discharge air axially in a path generally concentric to the path of flow of the air into the rotor.

9. A trap as claimed in claim 8 in which the axis of the chamber is horizontal and the inlet conduit opens thereinto through the lower end of the cylinder wall of the chamber.

10. A trap as defined in claim 8 wherein both axial ends of the rotor are open, and including a tube fixed to the opposite end of said chamber from said discharge pipe and coaxially thereto, said tube extending generally coaxially and with radial clearance into said rotor, the outer end of said tube being closed.

11. A trap as defined in claim 10 including radially inwardly directed vanes formed around the peripheries of the respective open ends of the rotor, for cooperation with the inflowing air to rotate said rotor.

References Cited in the file of this patent

UNITED STATES PATENTS

| | | |
|---|---|---|
| 410,152 | Cockrell | Sept. 3, 1889 |
| 1,229,471 | Jones et al. | June 12, 1917 |
| 1,530,825 | Grimes | Mar. 24, 1925 |
| 2,793,712 | Graswich et al. | May 28, 1957 |

FOREIGN PATENTS

| | | |
|---|---|---|
| 683,986 | France | Mar. 10, 1930 |